United States Patent [19]

Rehmer et al.

[11] Patent Number: 4,999,218

[45] Date of Patent: Mar. 12, 1991

[54] PREVENTION OF EFFLORESCENCE PHENOMENA ON MINERAL SUBSTRATES

[75] Inventors: Gerd Rehmer, Bobenheim-Roxheim; Manfred Schwartz, Ludwigshafen; Bernhard Dotzauer, Maxdorf, all of Fed. Rep. of Germany

[73] Assignee: BASF Aktiengesellschaft, Ludwigshafen, Fed. Rep. of Germany

[21] Appl. No.: 390,836

[22] Filed: Aug. 8, 1989

[30] Foreign Application Priority Data

Aug. 18, 1988 [DE] Fed. Rep. of Germany ....... 3827975

[51] Int. Cl.$^5$ ............................................. B05D 3/06
[52] U.S. Cl. ................................. 427/54.1; 427/379; 427/393.6; 428/540; 524/356; 524/359
[58] Field of Search .................... 427/393.6, 54.1, 379; 428/500, 540; 524/356, 359

[56] References Cited

U.S. PATENT DOCUMENTS

| 4,133,909 | 1/1979 | Spencer | 524/359 X |
| 4,293,596 | 10/1981 | Furendal et al. | 427/393.6 |
| 4,511,699 | 4/1985 | Melby et al. | 525/205 |

FOREIGN PATENT DOCUMENTS

| 0123234 | 10/1984 | European Pat. Off. |
| 1222066 | 6/1960 | France . |
| 2146766 | 3/1973 | France . |
| 636328 | 5/1983 | Switzerland . |
| 1411268 | 10/1975 | United Kingdom . |

OTHER PUBLICATIONS

Chemical Abstracts, Band 109, 1988, Seite 95.

*Primary Examiner*—Michael Lusignan
*Attorney, Agent, or Firm*—Oblon, Spivak, McClelland, Maier & Neustadt

[57] ABSTRACT

Efflorescence phenomena on mineral substrates are prevented by coating the surface of the mineral substrates with aqueous polyacrylate dispersions and drying the coating, if necessary at elevated temperatures, by a process in which a mixture of
 (A) a dispersion of a copolymer of
  (a) (meth)acrylates of alkanols which are of 3 to 20 carbon atoms and have a tertiary CH group,
  (b) styrene, α-methylstyrene, methyl methacrylate, tert-butyl (meth)acrylate and/or (meth)acrylonitrile and
  (c) mono- and/or dicarboxylic acids of 3 to 5 carbon atoms and/or or their amides which may be substituted at the N atom by alkyl, and
 (B) an aromatic ketone
is used for the coating, and the coating is exposed to ultraviolet light.

5 Claims, No Drawings

PREVENTION OF EFFLORESCENCE PHENOMENA ON MINERAL SUBSTRATES

The present invention relates to a process for preventing efflorescence phenomena on mineral substrates, in which the mineral substrates are coated with aqueous polyacrylate dispersions.

Mineral substrates, in particular concrete roof tiles, but also conventional tiles, tend to exhibit efflorescence phenomena under the influence of weather, the said phenomena generally occurring in the form of white, pustule-like structures and gradually causing damage to the mineral substrates. In practice, attempts have therefore long been made to suppress such efflorescence phenomena by applying weather-resistant coatings. Of particular interest in this respect are coatings obtained from polymer dispersions, in particular from polyacrylate dispersions (cf. U.S. Pat. No. 4,511,699 and British Patent 1,411,268). Despite the relatively good resistance of polyacrylates to weather influences, the results obtained with the polyacrylate coatings to date are still unsatisfactory.

It is an object of the present invention to prevent efflorescence phenomena on mineral substrates, in particular on concrete roof tiles, for a longer period by means of improved polyacrylate coatings.

We have found that this object is achieved and that efflorescence phenomena on mineral substrates can be particularly effectively prevented by coating their surface with an aqueous polyacrylate dispersion and drying the coating, if necessary at elevated temperatures, if a mixture of (A) a 20–65% strength by weight aqueous dispersion of a copolymer of
  (a) from 20 to 70%, based on the weight of the copolymer, of (meth)acrylates of alkanols which are of 3 to 20 carbon atoms and have a tertiary CH group,
  (b) from 30 to 60%, based on the weight of the copolymer, of styrene, α-methylstyrene, methyl methacrylate, tert-butyl (meth)acrylate and/or (meth)acrylonitrile and
  (c) from 0.2 to 7%, based on the weight of the copolymer, of mono- and/or dicarboxylic acids of 3 to 5 carbon atoms and/or their amides which may be substituted at the N atom by alkyl of 1 to 4 carbon atoms, the said dispersion having a minimum film-forming temperature of from −30° to +30° C., and (B) from 0.1 to 5% by weight, based on the amount of the copolymer present in component (A) of an aromatic ketone is used for the coating, and the coating is exposed to ultraviolet light while it is being dried and/or after it has been dried.

Aqueous, 20–65% strength by weight dispersions of copolymers of the monomers (a), (b) and (c), the said dispersions having a minimum film-forming temperature of from −30° to +30° C., and their preparation are known per se. They preferably contain, as copolymerized monomers (a), 2-ethylhexyl acrylate and/or 2-ethylhexyl methacrylate and/or isooctyl acrylate and/or isooctyl methacrylate. Other suitable monomers (a) are isopropyl acrylate and methacrylate, isobutyl acrylate and methacrylate, isodecyl acrylate and methacrylate, isododecyl acrylate and methacrylate and also isostearyl acrylate and methacrylate, acrylates and methacrylates of alkanols of the stated type which are of 6 to 12 carbon atoms and have a tertiary CH group generally being preferred, and their amount is preferably from 30 to 60%, based on the weight of the copolymer.

Preferred comonomers (b) are styrene and methyl methacrylate as well as α-methylstyrene, in amounts of from 30 to 50%, based on the weight of the copolymer. Other suitable monomers (b) are tert-butyl acrylate and methacrylate, acrylonitrile and methacrylonitrile.

The monomers (c) are present as copolymerized units in the copolymer of dispersion (A) preferably in amounts of from 1 to 4%, based on the weight of the copolymer. Of particular interest are acrylic acid, methacrylic acid and itaconic acid, as well as crotonic acid, maleic acid, fumaric acid, acrylamide, methacrylamide, N-ethylacrylamide and -methacrylamide, N-butylacrylamide and -methacrylamide, N-ethylacrylamide, maleic acid monoamide and diamide, fumaric acid amides and itaconic acid amides.

In addition, the copolymers of dispersions (A), which preferably have minimum film-forming temperatures of from −20° to +10° C., may contain from 0 to 6%, based on the weight of the copolymer, of other monomers (d) as copolymerized units. Tetrahydrofurfuryl acrylates and methacrylates are of particular interest as monomers (d). Other suitable monomers (d) are alkoxyalkyl acrylates, such as 3-methoxy-n-butyl acrylate and methacrylate, 2-and 3-n-butoxymethyl-n-butyl acrylate and methacrylate, 2-ethoxy-n-propyl acrylate and methacrylate, 3-ethoxyhexyl acrylate, 4-n-propoxy-n-hexyl methacrylate, 5-methoxy- n-hexyl acrylate and methacrylate and 2-methyl-4-methoxyhexyl acrylate and methacrylate. The copolymer of dispersion (A) preferably contains from 1 to 4%, based on the weight of the copolymer, of such monomers (d) as copolymerized units, tetrahydrofurfur-2-yl acrylate and methacrylate and 2- and 3-methoxy-n-butyl acrylate and methacrylate being preferred.

In the copolymers of the dispersions (A), up to 25% of the monomers (a) can be replaced by ethyl acrylate, ethyl methacrylate, n-butyl acrylate and methacrylate and/or n-hexyl acrylate and/or methacrylate and/or vinyl esters of, preferably, carboxylic acids of preferably 1 to 12 carbon atoms, in particular vinyl formate, vinyl acetate, vinyl propionate, vinyl n-butyrate and/or vinyl laurate.

The polyacrylate dispersions (A) can be prepared in a conventional manner using the conventional free radical polymerization initiators and conventional anionic and, if necessary, additional nonionic dispersants. In general, they are prepared using persulfates, such as ammonium persulfate and potassium persulfate, and the anionic emulsifiers used, in amounts of, preferably, from 0.5 to 2.5% by weight, based on the monomers, are frequently sulfated alkoxylation products of, in general, alkanols of 12 to 20 carbon atoms which may be monoolefinically unsaturated, such as lauryl alcohol, stearyl alcohol, oleyl alcohol or sperm oil alcohol, or alkylamines of 12 to 20 carbon atoms which may be monoolefinically unsaturated or alkylphenols generally containing 8 to 12 carbon atoms in the alkyl groups, such as n-octylphenol, n-nonylphenol, isononylphenol or n-dodecylphenol, and in general ethylene oxide and/or propylene oxide can be used for their alkoxylation and the degree of alkoxylation corresponds to, in general, from 5 to 80, preferably from 10 to 30, moles of alkylene oxide, preferably ethylene oxide, per mole of fatty alcohol, fatty amine or alkylphenol. Such alkoxylation products are generally used in the form of their water-soluble alkali metal or ammonium salts. Corresponding nonsulfated alkoxylated fatty alcohols, fatty amines or alkylphenols may additionally be used. The emulsion polymerization for the preparation of the polyacrylate dispersions (A) can be carried out under the conventional temperature conditions of, in general, from 40 to 90° C., preferably by the monomer or emulsion feed process. The K values of the novel copolymers (determined according to DIN 53,726) in 0.5% strength solution in tetrahydrofuran at 25° C. should be in general from 50 to 150, preferably from 75 to 85.

The aromatic ketones are used in the mixtures in general in amounts of from 0.1 to 5, preferably from 0.2 to 2.5, % by weight, based on the amount of the copolymer present in component (A). Benzophenone and benzophenone derivatives, such as 3,3'-dimethyl-4-methoxybenzophenone, 3- and 4-hydroxybenzophenone, benzophenone-2-carboxylic acid, benzophenone-3-carboxylic acid, benzophenone-4-carboxylic acid, benzophenone-3,3',4,4'-tetracarboxylic acid and benzophenone-3,3',4,4'-tetracarboxylic dianhydride, 3,3',4,4'-tetra-(tert-butylperoxycarbonyl)-benzophenone and 2-, 3- and 4-phenylbenzophenone, 2-, 3- and 4-alkylbenzophenones where alkyl is of 1 to 10 carbon atoms, such as 2-, 3- and 4-methylbenzophenone and 2-, 3-and 4-nonylbenzophenone, dialkylbenzophenones, such as 4,4'-diisopropylbenzophenone, and also olefinically unsaturated and water-soluble benzophenone derivatives are particularly preferred. Other suitable aromatic ketones or benzophenone derivatives are 2-acetonaphthone, 4-aminobenzophenone and 4,4'-tetramethylaminobenzophenone. Aromatic ketones of this type are generally added to the polyacrylate dispersions (A) in the form of a finely divided suspension or, in some cases, also in pure form, if necessary at elevated temperatures, generally with stirring.

In addition, pigments and pigment formulations, such as titanium oxides, iron oxides and colored pigment formulations can be added to the dispersions in conventional amounts.

In the novel process, the mixtures of the polyacrylate dispersions and the aromatic ketones, which may contain fillers, can be applied to the mineral substrates in a conventional manner. Examples of suitable mineral substrates are formed structures of asbestos cement, concrete and gas concrete, for example slabs, pipes and in particular roof tiles, and the coatings can also be applied to unhardened products of this type, in particular concrete roof tiles. Application is effected in a conventional manner by spraying, trowelling, knifecoating, roller-coating or pouring, from 100 to 250 g/m² generally being applied. The application of such coatings to concrete roof tiles which have not set is of particular interest. The coatings can be dried in a conventional manner, if necessary at room temperature or slightly elevated temperatures, in general at from 20° to 100° C., preferably from 50° to 80° C., and it is possible to use, for example, radiant heaters or hot-air circulation apparatus. The coated mineral substrates can advantageously be simultaneously exposed to ultraviolet light, an inert gas atmosphere being unnecessary. Conventional UV lamps, for example low pressure, medium pressure or high pressure mercury vapor lamps whose powers may be, for example, from 80 to 160 W/cm or more, can be used for this purpose. A plurality of such UV radiation sources can also advantageously be used.

This gives, on the mineral substrates, firmly adhering coatings which have excellent aging resistance and a particularly long life. When the mineral substrates coated by the novel process, in particular coated concrete roof tiles, are used, the surface of the coating is attacked in the course of time by the weather, the attacked areas in which previously inaccessible further aromatic ketones are now exposed, are again crosslinked by the UV component of the sunlight, with the result that the coating layers underneath are effectively protected. As a result of this self-repair, the mineral substrates treated according to the invention, i.e. the coatings, have a substantially longer life than the coatings produced using conventional compositions.

In the Examples which follow, parts and percentages are by weight. K values stated in the Examples were determined in 0.5% strength solution in tetrahydrofuran at 25° C. according to DIN 53,726 and the minimum film-forming temperatures were determined according to DIN 53,787.

EXAMPLE 1

A 50% strength aqueous dispersion of a copolymer of 49 parts of 2-ethylhexyl acrylate, 49 parts of methyl methacrylate and 2 parts of acrylic acid is prepared in a conventional manner by the emulsion feed process, 0.4%, based on the monomers, of sodium peroxodisulfate being used as a polymerization initiator and 1.5%, based on the monomers, of a commercial emulsifier being employed. The polymerization is carried out at 80° C. The polyacrylate obtained has a K value of 80 and the dispersion has a minimum film-forming temperature (MFT) of 8° C.

0.5%, based on the polyacrylate, of benzophenone is stirred into the polyacrylate dispersion at 60° C. The mixture is diluted with water to a polyacrylate content of 40%, and 0.5% of a commercial antifoam is added.

Green concrete roof tiles are uniformly sprayed with the resulting coating agent using a spray gun (about 2 bar spray pressure), in such a way that 120 g/m² are applied. The green concrete roof tiles are produced in the form of flat tiles measuring 30×20×1.8 cm by extruding a mortar consisting of sand (particle size not more than 0.3 mm) and cement (ratio 1:3) and having a water/cement factor of 0.4, the said mortar being colored with 3% of iron oxide pigment black. To cure the coated concrete roof tiles, they are dried in a conditioned chamber for 30 minutes at 50% relative humidity, after which they are exposed for 10 minutes to a 10 W UV lamp and then dried for 2.5 hours at about 50% relative humidity and then for 3 hours at about 95% relative humidity. They are then stored for 24 hours at room temperature and the coating is exposed to water vapor at 60° C. for 24 hours. After drying for 7 days at room temperature, the coating is rated visually. The results are summarized in the Table at the end of the Examples.

EXAMPLE 2

A 50% strength aqueous dispersion of a copolymer of 46 parts of 2-ethylhexyl acrylate, 48 parts of methyl methacrylate, 4 parts of tetrahydrofurfur-2-yl acrylate and 2 parts of acrylic acid is prepared by the emulsion feed process in a conventional manner. 0.4%, based on the monomers, of sodium peroxodisulfate is used as the polymerization initiator and 1.5%, based on the monomers, of a commercial emulsifier are employed and polymerization is carried out at 85° C. The copolymer obtained has a K value of 78 and the dispersion has an MFT of 9° C.

0.4%, based on the polyacrylate, of benzophenone is added to the polyacrylate dispersion heated to 60° C, the dispersion is diluted to a polyacrylate content of 40% and 0.5% of a commercial antifoam is added.

Green concrete roof tiles are then coated as described in Example 1. The result is stated in the Table at the end of the Examples.

EXAMPLE 3

A 50% strength aqueous dispersion of an emulsion copolymer of 53 parts of 2-ethylhexyl acrylate, 40 parts of styrene, 3 parts of acrylic acid, 2 parts of acrylamide and 2 parts of tetrahydrofurfur-2-yl methacrylate is prepared, 0.4%, based on the monomers, of sodium peroxodisulfate being used as the initiator and 2.0 parts, based on the monomers, of an emulsifier being employed and polymerization being carried out at 85° C. The dispersion obtained has an MFT of about 0° C. and the polyacrylate has a K value of 90.

The polyacrylate dispersion is diluted with water to 40%, 0.5 part of 2-hydroxy-3-(4-benzoylphenoxy)-N,N,N-trimethyl-1-propaneammonium chloride monohydrate part of a commercial antifoam are added and green concrete roof tiles are coated as described in Example 1. The results obtained are summarized in the Table at the end of the Examples.

EXAMPLE 4

A 50% strength aqueous dispersion of an emulsion copolymer of 40 parts of styrene, 50 parts of 2-ethylhexyl acrylate, 2 parts of acrylamide, 2 parts of acrylic acid, 3 parts of tetrahydrofurfur-2-yl acrylate and 3 parts of a commercial copolymerizable benzophenone derivative is prepared as described in Example 3. The MFT of the resulting dispersion is about 0° C. and the K value of the polyacrylate is 87.

0.5 part of a commercial antifoam is added to the polyacrylate dispersion, diluted with water to 40%. Green concrete roof tiles are then coated as described in Example 1. The results obtained are summarized in the Table at the end of the Examples.

EXAMPLE 5

The procedure described in Example 4 is followed, except that 1%, based on the polyacrylate, of benzophenone is added instead of the copolymerizable benzophenone derivative. The results obtained in the coating of concrete roof tiles are summarized in the Table at the end of the Examples.

EXAMPLE 6

The procedure described in Example 2 is followed, except that (a) 1.5% of benzophenone or (b) 1.5% of 4hydroxybenzophenone or (c) 2% of thioxanthone are used instead of 1% of benzophenone. The further procedure is as described in Example 2. The results obtained are summarized in the Table below.

TABLE

| Example | Appearance of the dried coatings treatment with water vapor for 24 hours | |
|---|---|---|
| | before | after |
| 1 | Uniform, glossy | Little loss of gloss, no tack, virtually no efflorescence |
| 2 | Uniform, glossy | Little loss of gloss, no tack, no efflorescence |
| 3 | Uniform, glossy and good color reproduction | Virtually no efflorescence, slight tack |
| 4 | Uniform, glossy and good color reproduction | No change, no efflorescence |
| 5 | Uniform, glossy and good color reproduction | No change, no efflorescence |
| 6 | Uniform, glossy and good color reproduction | No change, no efflorescence |

We claim:
1. A process for preventing efflorescence phenomena on mineral substrates by coating the surface of the mineral substrates with an aqueous polyacrylate dispersion and drying the coating, if necessary at elevated temperatures, wherein a mixture of
   (A) a 20–65% strength by weight aqueous dispersion of a copolymer of
      (a) from 20 to 70%, based on the weight of the copolymer, of (meth)acrylates of alkanols which are of 3 to 20 carbon atoms and have a tertiary CH group,
      (b) from 30 to 60%, based on the weight of the copolymer, of styrene, α-methylstyrene, methyl methacrylate, tert-butyl (meth)acrylate and/or (meth)acrylonitrile and.
      (c) from 0.2 to 7%, based on the weight of the copolymer, of mono- and/or dicarboxylic acids of 3 to 5 carbon atoms and/or their amides which may be substituted at the N atom by alkyl of 1 to 4 carbon atoms, the said dispersion having a minimum film-forming temperature of from −30° to +30° C., and
   (B) from 0.1 to 5% by weight, based on the amount of the copolymer present in component (A) of an aromatic ketone
is used for the coating, and the coating is exposed to ultraviolet light while it is being dried and/or after it has been dried.

2. A process as claimed in claim 1, wherein the aqueous dispersion (A) has a minimum film-forming temperature of from −20° to +10° C. and its copolymer is composed of
   (a) from 20 to 70%, based on the weight of the copolymer, of (meth)acrylates of alkanols which are of 6 to 12 carbon atoms and have a tertiary CH group,
   (b) from 30 to 60%, based on the weight of the copolymer, of styrene, α-methylstyrene and/or methyl methacrylate,
   (c) from 1 to 4%, based on the weight of the copolymer of mono- and/or dicarboxylic acids of 3 to 5 carbon atoms and/or their amides which may be substituted at the N atom by alkyl of 1 to 4 carbon atoms, and
   (d) from 0 to 6%, based on the weight of the copolymer, of tetrahydrofurfuryl (meth)acrylate and/or alkoxyalkyl (meth)acrylates whose alkoxy groups are of 1 to 4 carbon atoms and are bonded to a middle $CH_2$ group.

3. A process as claimed in claim 1, wherein the mixture used for coating contains from 0.2 to 2.5% by weight, based on the amount of the copolymer present in component (A), of benzophenone and/or a benzophenone derivative as component (B).

4. A process as claimed in claim 1, wherein said aqueous dispersion consists essentially of a copolymer of (a), (b) and (c).

5. A process as claimed in claim 2, wherein said aqueous dispersion consists essentially of a copolymer of (a), (b), (c) and (d).

* * * * *